J. H. KRALL.
VEHICLE TIRE.
APPLICATION FILED MAR. 16, 1917.
1,293,473.
Patented Feb. 4, 1919.
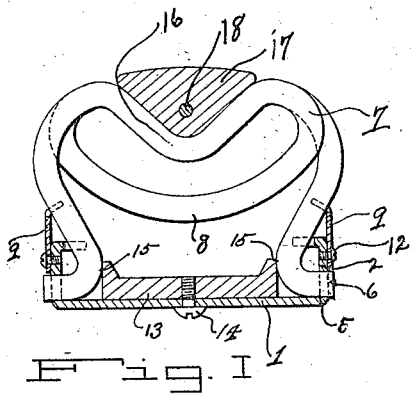
Fig. I
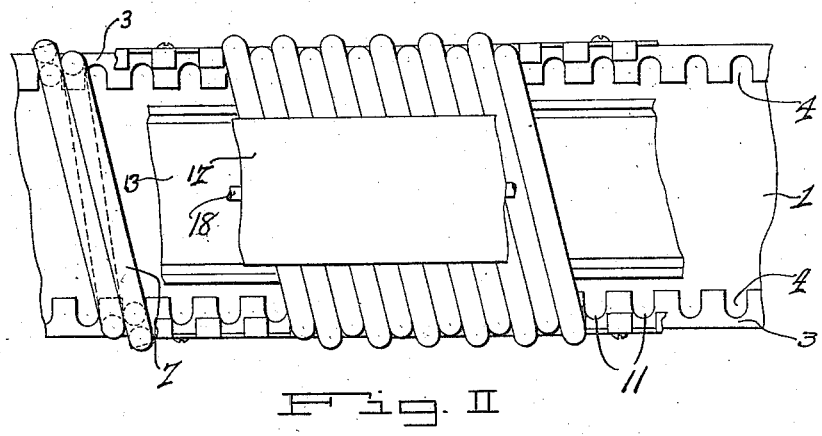
Fig. II
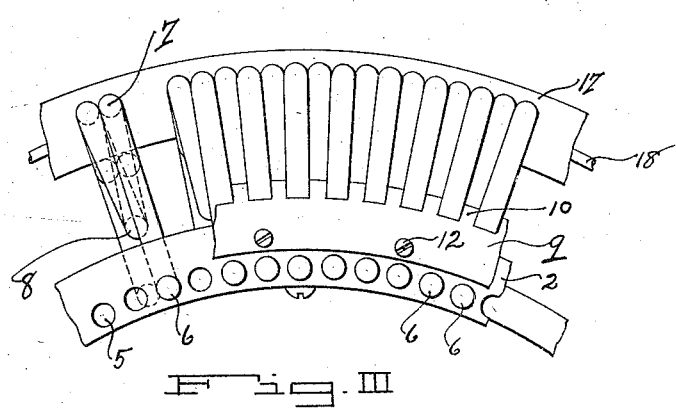
Fig. III
INVENTOR
John H Krall
BY
David E Lofgren
ATTORNEY

UNITED STATES PATENT OFFICE.

JOHN H. KRALL, OF PORTLAND, OREGON.

VEHICLE-TIRE.

1,293,473.
Specification of Letters Patent.
Patented Feb. 4, 1919.

Application filed March 16, 1917. Serial No. 155,267.

*To all whom it may concern:*

Be it known that I, JOHN H. KRALL, a citizen of the United States, residing at 533 Hoyt street, Portland, in the county of Multnomah and State of Oregon, have invented new and useful Improvements in Vehicle-Tires, of which the following is a specification.

This invention relates to improvements in vehicle tires and aims to provide a puncture proof tire of very cheap construction which will also be highly efficient.

A second object of my invention is to provide an efficient and economical means of using a cushion tread with a tire composed principally of wire loops.

A final object of my invention resides in the particular arrangement and combination of parts hereinafter described.

In the accompanying drawings, Figure I is a cross-sectional view taken through the rim of a wheel equipped with my improved tire and arranged according to my invention.

Fig. II is a top plan view of the parts shown in Fig. I.

Fig. III is an elevational view of the parts shown in Figs. I and II.

Throughout the separate views the same part is designated by the same reference character.

Referring more particularly to the drawings, 1 is a wheel rim adapted to be mounted upon the felly of a wheel of ordinary size or to be carried by any desired form of wheel. The edges of the rim 1 are bent to form a pair of upstanding flanges, such as 2 and the edges of the flanges 2 are bent again inwardly parallel to the rim 1 so as to provide inwardly directed flanges such as 3. Each of the flanges 3 is notched as shown at 4, the notches 4 in one flange being staggered with relation to the notches in the other flange 3 and immediately below each notch 4 I provide a round hole such as 5 for receiving the end 6 of wire loop 7. It will be clear from the foregoing that the holes 5 in one of the flanges 2 are staggered from the holes 5 in the other of said flanges. The ends 6 of all the loops 7 are bent so as to be parallel to the face of the rim 1 at the point where the ends enter the holes 5 and then the loop is bent upwardly and outwardly so as to pass through one of the notches 4. The loop is then bent gradually toward the other side of the rim and turned inwardly again passing beneath the tread portion to the same side of the rim, then across the tread portion of the tire to the other side of the rim where it is turned downwardly, passing through one of the notches 4 on the other side of the rim and then bent outward parallel to the rim 1 so as to enter one of the holes 5 on the other side of the rim. Thus it will be seen that the wire of each loop member 7 appears twice on the tread side of the tire and once as shown at 8 on the under or rim side, the portion 8 lying some distance above the rim 1 intermediate the tread portion and the rim.

I may also provide and as shown in the drawing two ring members such as 9, one fixed to each of the flanges 2 and extending outwardly therefrom, each of the ring members 9 being notched at its upper edge to form fingers 10 and the fingers 10 are turned inwardly to form notches 11 between which the side portions of the loop 7 extend between the notches 4 and the tread portion of the tire. The rings 9 may be secured to the flanges 2 by means of screws 12 or by other suitable means.

In order to guard against the danger of the ends 6 springing out of the holes 5 when the tire is in use, I provide a band 13 which may be fixed to the rim 1 by screws such as 14 or in any other suitable manner, the edges of the band 13 lying next to the ends of the loops 7 at the point such as 15 where the said loops are bent outwardly to pass through the holes 5. However, it will be understood that I have built tires otherwise similar to the structure previously described in which the band 13 was omitted, although I prefer to use this element as a matter of precaution.

The tread surfaces of each loop 7 are preferably bent inwardly as shown at 16 so as to form a groove for the reception of a cushion tread 17 which may be of rubber or other suitable material, and I provide a wire such as 18 extending circumferentially of the tire through the tread 17 to prevent the tread from becoming displaced.

Having thus described my invention, I claim:

1. A vehicle supporting structure comprising in combination a rim, a portion of which is provided with apertures, and a tire member mounted on said rim comprising individual loop elements, the ends of each loop element being extended through two of said apertures, said rim having a portion provided with notches coöperating with portions of said loop elements and means located outwardly of the apertures and notches, adapted to serve as additional supporting means for the loops.

2. A vehicle supporting structure comprising in combination a rim, a portion of which is provided with apertures, and a tire mounted on said rim comprising individual loop elements, the ends of each loop element being extended through two of said apertures, said rim having a portion provided with notches coöperating with portions of said loop elements, and additional supporting means for said loop elements including a pair of ring members located one on each side of the rim and having their outer edges outwardly of the apertures and notches and engaging the loop elements.

3. A vehicle supporting structure comprising in combination a rim, a portion of which is provided with apertures, and a tire mounted on said rim comprising individual loop elements, the ends of each loop element being extended through two of said apertures, said rim having a portion provided with notches coöperating with portions of said loop elements, and additional supporting means for said loop elements including a pair of ring members located one on each side of the rim and having their outer edges notched and adapted to engage the loop elements outwardly of the apertures and first named notches.

JOHN H. KRALL.

Copies of this patent may be obtained for five cents each, by addressing the "Commissioner of Patents, Washington, D. C."